July 1, 1930.  F. D. HOLDSWORTH  1,768,843
VALVE
Filed May 22, 1920
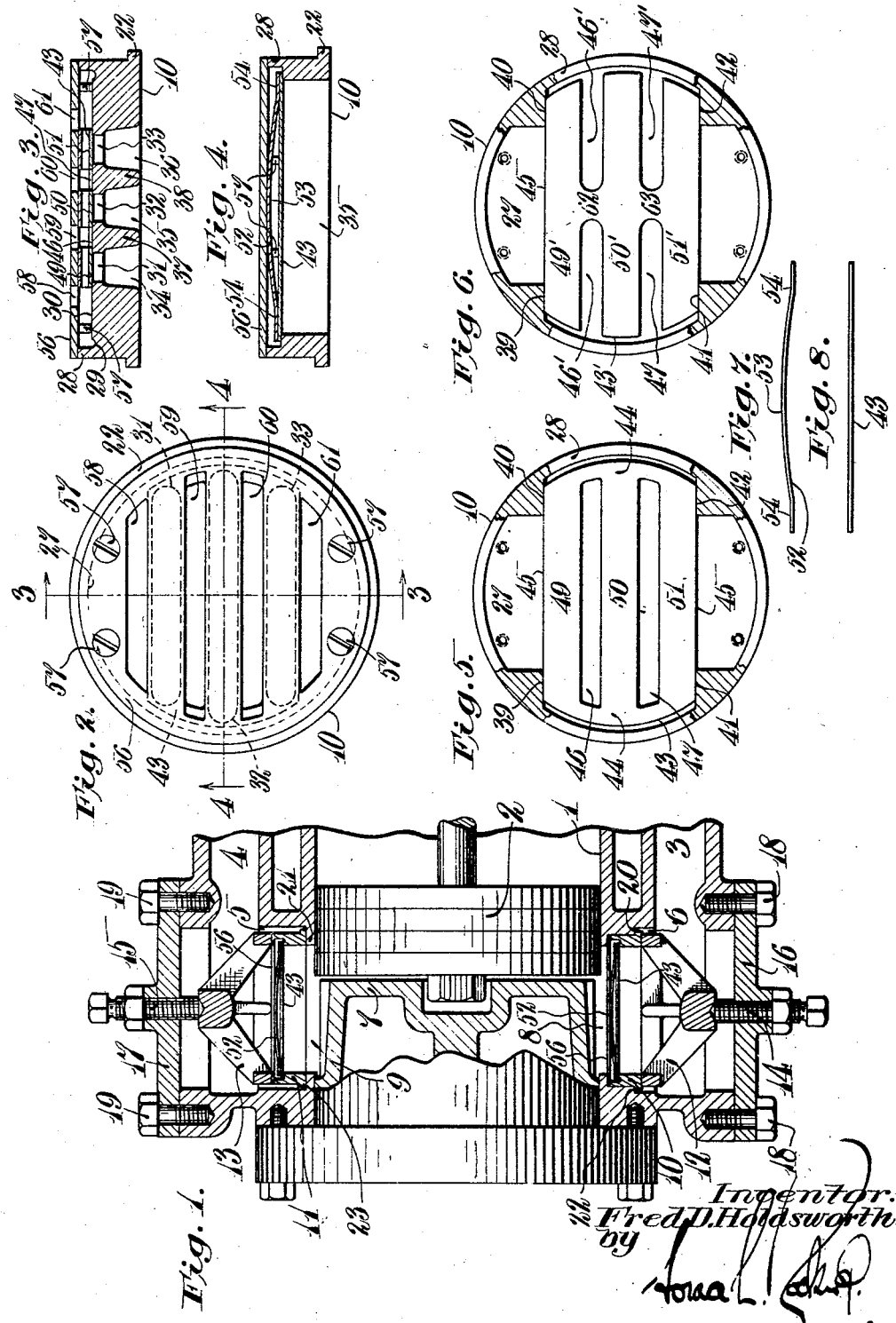
Inventor:
Fred D. Holdsworth.
by
Atty.

Patented July 1, 1930

1,768,843

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE

Original application filed March 2, 1916, Serial No. 81,727. Divided and this application filed May 22, 1920. Serial No. 383,509.

My invention relates to valves and more especially to valves of the flexible type commonly known as plate valves.

Among the objects of my invention is the provision of an improved valve of the type mentioned having greatly increased port area. Another object of my invention is to provide an improved plate valve having wear resisting qualities to a high degree. A further and more specific object of my invention is to provide a plate valve of an improved and simplified construction which is especially adapted to use in connection with compressors, the valve being of large area, readily inserted or removed, and of such construction that no parts may become separated and enter the cylinder. A still further object of my invention is to provide a valve which will seat positively and uniformly over the entire valve seat and one which will be free from any tendency to chattering. These and other objects of my invention will hereinafter appear.

In the accompanying drawings I have shown, for purposes of illustration, certain embodiments which my invention may assume in practice, the latter being illustrated as applied to a compressor, although it is to be understood that they are not limited to use in such a machine and may be used in widely varied relations.

In these drawings,—

Fig. 1 is a partial vertical sectional view of one end of the compressor showing illustrative forms of inlet and discharge valves according to my improved construction, certain parts being broken away to facilitate illustration and the valve members proper being shown in section as on a line parallel to the line 4—4 of Fig. 2.

Fig. 2 is an enlarged plan view of one of the valve cages.

Fig. 3 is a central vertical section on the line 3—3 of Fig. 2 through a valve and its cage.

Fig. 4 is a similar view on the line 4—4 of Fig. 2.

Fig. 5 is a plan view of a valve cage with the cover removed and with parts broken away to illustrate the construction, the valve being shown in position on its seat.

Fig. 6 is a similar view showing a different construction of the valve.

Figs. 7 and 8 are side elevations respectively of the valve spring and of the valve member.

The compressor of which a part is shown is a familiar commercial type comprising a cylinder 1 and a piston 2 reciprocable within the cylinder to draw air into the cylinder from an inlet 3 and discharge air under pressure from the cylinder into an outlet 4. Suitable pockets 5 and 6 are provided on opposite sides of the head 7 adjacent inlet and outlet openings 8 and 9 to receive containers or cages 10 and 11 containing my improved valve members proper hereinafter described, the cages 10 and 11 being clamped into the sockets and adjacent the openings 8 and 9 respectively by suitable clamps 12 and 13 held in place by set screws 14 and 15 which are mounted in cover plates 16 and 17 bolted to the cylinder casing by suitable bolts 18 and 19. It will be noted that in my improved construction, as shown in Fig. 1, the valve sockets 5 and 6 are provided with ledges 20 and 21 respectively and that the valve cages are provided with the cooperating ledges 22 and 23 making fluid tight joints with the first mentioned ledges and serving to center the valves with respect to the openings 5 and 6.

As the valve cages 10 and 11 are of identical construction, a description of either of the cages will suffice for both. As shown, the inlet cage 10 is provided with a central circular recess 27 on its upper surface leaving an annular upstanding wall 28 extending around the edge of the same. In the bottom of this recess an annular groove 29 is provided to form a readily machinable circular seat 30. The bottom of this recess is also provided with a series of parallel slots 31, 32 and 33 of different lengths cooperating to provide a multiported valve seat, each slot having its opposite ends lying along arcs struck from the same center. Communicating with the slots 31, 32 and 33 are passages 34, 35 and 36 respectively formed in the under side of the cage, which passages are in turn spaced apart by grid-like members 37 and 38. It will also be noted that suitable guiding surfaces 39, 40, 41, and 42 are formed in the interior of the valve cage, these being adapted to cooperate with the valve plate and spring hereinafter described, to guide and dispose the same with respect to the valve seat.

Carried on the bottom of the recess 27 is a valve member 43 preferably of plate type and formed of sheet metal, preferably sheet steel. In the form of my invention illustrated in Fig. 5 this valve member is preferably provided with round paddle like ends 44 adapted normally to rest on the seat 30 and straight sides 45 so that it is guided relative to the slotted seat in the recess 27 in the cage. As will be noted, the valve is of the multiple closure type and is provided with a pair of spaced parallel slots 46 and 47, normally adapted to overlie the grid-like members 37 and 38, while the intervening strip-like portions or spaced elements 49, 50 and 51 of the valve overlie the slots 31, 32 and 33 in the valve seat.

Cooperating with this valve member I provide a spring member 52 which may assume various forms but which in each case is preferably of the same form as the valve, as shown in the plan in Fig. 5, this spring having similar slots, strip-like and guiding portions as has the valve 43 and having these parts of the same size so that they are adapted to coincide with the same portions of the valve proper. It will be noted, however, from the side elevation shown in Fig. 7 that the spring is bowed as at 53 and flattened or bent up for a short distance at either end as indicated at 54, the purpose of this being to provide lines of contact between the valve and the spring whereby the spring will press upon the valve along parallel lines and bear uniformly upon the same to cause smooth seating all the way across the seat. The spring is preferably disposed with the bowed side thereof adjacent the valve member, as clearly shown in Fig. 4.

Extending over the spring 52 and with its under surface normally engaged by the bowed central portion 53 of the spring and preferably operating to hold both the spring and the valve within the valve cage is a valve cage cover 56 which is held in position with respect to the valve cage by means of a series of countersunk-headed machine screws 57. This cover member or plate, as shown, preferably assumes the form of a plate which rests upon the upper edge or annular wall of the valve cage and is provided with a series of slots 58, 59, 60 and 61 disposed parallel to each other and having their ends shaped similarly to the ends of slots 46, 47, of the valve and those of its spring, and with the latter the central slots 59 and 60 register. It will accordingly be noted that the valve, the valve spring, and the valve cage cover are so formed that when the valve is raised from its seat, the openings through each coincide, thereby providing a very large area for the uninterrupted flow of air through the ports. When the valve is raised from its seat, it is guided by the surfaces 39, 40, 41 and 42 so that during raising and seating, it is positively guided and the spring, by means of contacts between the bent up ends thereof and the ends of the valve, effects a uniform lifting and reseating of the ends of the valve and prevents chattering. As the valve first lifts from its seat, the central portion, being pressed by the spring to a less degree than the ends, tends to bow slightly and rise first from the seat, but as the pressure from the air increases, the ends of the valve are raised and tend to remove the bow from the spring and to flatten the same against the lower surface of the valve cage cover. When the valve is fully open, the valve and the spring lie in substantially parallel relation to the valve cage cover and instead of lines of contact, there is substantially surface contact between the entire valve and spring and the entire spring and valve cage cover.

In Fig. 6 I have shown another form which the valve and spring may assume in practice. In this case the valve 43' is provided with a series of slots 46' and 47' arranged at opposite ends of the valve, the strip like elements 49', 50' and 51' bounding the slots being connected by portions 62 and 63 located adjacent the middle of the valve. The spring will be identical in contour but with bent up or flattened ends, the same as in the previously described form of my invention.

This application is a division of my copending application, Serial No. 81,727, filed March 2, 1916.

While I have in this application specifically described certain forms which my invention may assume in practice, it will be understood that these forms of the same are shown for purposes of illustration and that the invention may be modified and embodied in other forms without departing from its spirit or the scope of the appended claims.

What I claim as new and desire to secure by Letters Patent is:

1. In a valve, the combination of a ported seat, an elongated valve member, a valve retaining member, and a normally bowed resilient member progressively engageable with a rolling but non-slidable effect throughout its length with the surface of said valve retaining member as the valve member is lifted from its seat.

2. In a valve, the combination with a ported seat and a cover, of a valve member between the same, and a resilient valve seating member initially having a single line contact only with said cover and flexible with a rolling but non-slidable effect upon lifting of said valve member into surface contact therewith, said valve seating member having a transverse cross section at said intial line contact at least as great as at other points in said surface contact.

3. In a valve, the combination with a ported seat and a cover, of a valve member between the same, and a resilient valve seating member initially having line contact only with said cover and flexible with a rolling but non-slidable effect into surface contact with said cover upon lifting of the valve member, said valve seating member having a transverse cross section at said initial line contact at least as great as at other points in said surface contact.

4. In a valve, the combination with a ported seat, of a valve member, a valve retaining member, and a single bowed plate spring disposed between said retaining member and said valve member and movable upon opening of the valve with only a rolling effect into a progressively increasing surface contact with said valve retaining member and means for retaining said spring in position contacting only with the outer periphery thereof.

5. In a valve mechanism, a ported seat, a valve member cooperating therewith, a cover, a flexed spring plate member having contact with said valve and with said cover along at least three parallel lines, of which three lines the most widely separated are contacts with the valve, and the intermediate with the guard, the last mentioned line being the longest of the three.

6. In a valve, a ported seat, a flexible valve member cooperating with said seat, a member spaced from said valve and parallel thereto when said valve closes, and a flexed spring plate member having contact with said valve and with said first mentioned member along at least three parallel lines, of which three lines the most widely separated are contacts with the valve, and the intermediate with the first mentioned member, said last line being the longest.

7. In a valve mechanism, a seat member having a longitudinal port, a valve member covering said port, a bowed spring having contact with said valve adjacent the ends of said port and having its portion overlying said port imperforate, and a cover having line contact with said spring when said valve is seated, said last mentioned contact lying between the loci of the contacts between the spring and valve, and the contacts between said spring and valve during the opening movement of said valve being line contacts and moving apart as opening movement progresses.

8. In combination, in a valve mechanism, a ported seat, a cover, a flexible valve member similar in contour to said port, and a transversely flexed spring similar in contour and dimension to said valve member disposed between the latter and said cover and having line contact with said cover and at opposite sides of said line contact contacts with said valve member, said last mentioned contacts during opening of said valve member being line contacts and having relative movement as opening progresses.

9. In a valve mechanism, a seat member having a longitudinal port, a valve member covering said port, a bowed spring having contact with said valve adjacent the ends of said port and having its portion overlying said port imperforate, and a cover having line contact with said spring when said valve is seated, said last mentioned contact lying between the loci of the contacts between the spring and valve, and the contacts between said spring and valve at each end of the latter extending substantial distances on both sides of the center of the port.

10. In combination, in a valve mechanism, a ported seat, a cover, a flexible valve member similar in contour to said port, and a transversely flexed spring similar in contour and dimension to said valve member disposed between the latter and said cover having line contact with said cover and at opposite sides of said line contact contacts with said valve member, said last mentioned contacts being of substantial length in a direction parallel to the axis of flexure of said spring member whereby tilting of said valve member on opening about an axis at right angles to the axis of flexure of said spring is prevented.

11. In a valve, a ported seat, a flexible valve member cooperating with said seat, a cover, and a flexed spring plate member having at all times contact with said valve and with said cover along at least three parallel lines, the line of contact with said cover being intermediate the lines of contact with said valve and being continuous between its ends and of a length at least equal to the length of said parallel lines of contact with said valve.

12. In a valve, a ported seat, a flexible valve member cooperating with said seat, a cover, guiding means for said valve disposed between said cover and said seat, and a flexed spring plate member of substantially the same cross section throughout its flexing portions, said spring having the elements of its surface all perpendicular to a single plane and being disposed between said valve and cover and having at points adjacent its opposite ends contacts with said valve member each of which includes a plurality of points of contact through which a single straight line substantially parallel to the elements of the surface of the flexed spring passes.

13. In a valve, the combination with a ported seat, of a ported cover plate, a spring having line contact with said plate, and a valve member between said spring and said ported seat having when seated contacts with said spring only adjacent the opposite ends of the latter, whereby the central portion of the valve member is bodily movable first from the valve seat, each of said contacts between said spring and valve extending transversely of the latter, and being of substantial length in the direction in which said line contact extends, whereby tilting of said valve is opposed.

14. In a compressor valve, a ported seat, a flexible valve similar in contour to said seat, a bowed spring similar in contour and in length to said valve and imperforate above the port, and an abutment member placing said spring in contact with the valve, said spring being flexed with all the elements of its flexed portion substantially parallel to a single straight line, and having engagement with said valve adjacent the opposite ends of its flexed portion, the engagement at at least one of said ends including contacts respectively adjacent opposite sides of said spring.

15. In a valve, a seat provided with a longitudinally extending port, a valve member covering said port, a bowed spring having at all times at least two lines of contact with said valve between the ends of the port and having the portion thereof overlying the port imperforate, said cover having a line contact with said spring between said first mentioned lines of contact, and guiding means for said valve and spring engaging only the outer edges thereof, said several lines of contact all extending in substantially the same direction.

16. In a valve, a ported seat, a valve member cooperating with said seat, a cover, and a flexed spring plate member having contact with said valve and with said cover along at least three parallel lines, the line of contact with said cover being intermediate said lines of contact with said valve and being of greater length than the latter.

17. In a valve mechanism, a ported seat, a valve member cooperating with said seat, a guard member, and a flexed spring member whose projection on said valve member would lie within the outline of the latter and which contacts with said valve and guard members in at least three parallel lines, the line of contact with said guard member being intermediate spaced lines of contact with said valve member, said valve spring member being of less cross sectional area adjacent its lines of contact with said valve member than adjacent its line of contact with said guard member.

18. In a valve, a ported seat, a valve member cooperating with said seat, a cover, and a flexed spring plate member having contact with said valve and with said cover at all times along at least three parallel lines, the line of contact with said cover being intermediate lines of contact with said valve and said line of contact with said cover extending the full width of said spring while said spring contacts with said valve along a plurality of spaced lines at each end thereof.

19. In a valve, a ported seat, a valve member cooperating with said seat, a guard, and a flexed spring plate member contacting with said guard along a line extending substantially the full width of said member and having a plurality of laterally spaced fingers engageable with said valve member along a plurality of lines at each side of said first mentioned line and extending in substantially the same direction as the latter.

20. In a valve, a ported seat, a flexible valve cooperating with said seat, a member spaced from said valve and parallel thereto when said valve closes, and a flexed spring plate member having contact with said valve and with said first mentioned member at all times along at least three parallel lines, the line of contact with said first mentioned member being intermediate said lines of contact with said valve and said last mentioned lines being adjacent the opposite ends of said valve and movable longitudinally of said valve when the latter opens.

In testimony whereof I affix my signature.

FRED D. HOLDSWORTH.